Patented Aug. 16, 1927.

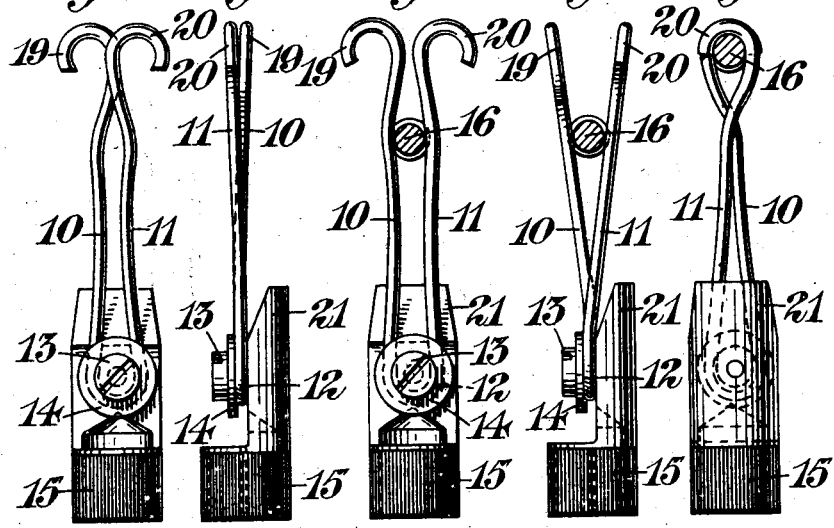
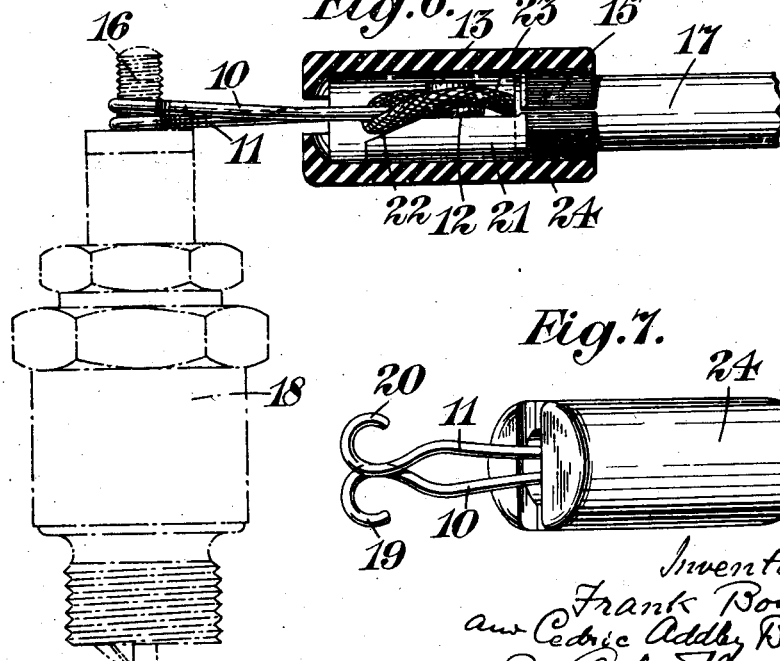

1,638,978

UNITED STATES PATENT OFFICE.

FRANK BOURNE AND CEDRIC ADDLEY BOURNE, OF LONDON, ENGLAND.

CONNECTING DEVICE.

Application filed March 24, 1926, Serial No. 96,908, and in Great Britain January 25, 1926.

This invention relates to a device for making connection, whether mechanical or mechanical and electrical, with a bar or the like, the ends of which may be inaccessible, and has for its main object to provide a device for readily making tension-resisting connection to an electric terminal-screw, or binding post (for example the binding post of a sparking plug) without the necessity of removing the clamping-nut.

One form of a connecting device according to this invention comprises two prongs disposed side-by-side, connected together at one end, resiliently movable towards and away from one another, and having each at its extremity a hook which lies in or substantially in a plane containing the prong and which extends in a direction opposed to that of the companion hook, whereby a bar or the like may be placed between the prongs, the device rotated about its longitudinal axis relatively to the bar (or vice versa) to strain the prongs into a position wherein the hooks are together engageable with the bar, whereupon the bar may be engaged with the hooks and be gripped resiliently between them.

Preferably each hook is made integral with its prong, for example by bending a length of resilient wire into the required shape, and the two prongs may conveniently be made from a single length of wire doubled at its middle.

It is preferred to form the hooked prongs in the shape of shepherds' crooks of identical size disposed "back-to-back" but somewhat overlapping. At the parts where they overlap there may be a slight gap between the two crooks, although it is preferred to construct them so that they are kept in contact with each other by the resilience of the wire.

The two hooks evidently need not be exactly in the same or parallel planes; they may make any angle with each other which is not less than a right-angle, and the word "opposed" is used herein in that sense.

Moreover the planes containing the two hooks may occupy any position in relation to the plane containing the two prongs, although each hook must be in or substantially in a plane containing the prong to which it belongs.

The invention consists in the construction and arrangement of parts described hereinafter and pointed out in the claims.

One embodiment of the invention is illustrated by way of example in the accompanying drawing, wherein—

Figure 1 is a plan view of one form of connecting device according to the invention; and Figure 2 is a side elevation thereof;

Figures 3, 4 and 5 are plan views of the same device in various positions during its application to a bar;

Figure 6 is a side elevation, partly in section, showing the device in use connecting a high-tension cable with a sparking plug; and Figure 7 is a perspective view of the connecting device shown in Figure 6 but detached from the plug.

Like reference numerals designate like parts throughout the several views.

According to the drawing, a single length of resilient wire, for example brass wire, is bent into the form of a U to provide two prongs 10, 11 disposed side-by-side and integral one with the other at what may be termed the root end 12. This root end is firmly secured, as by a screw 13 and washer 14, with a member 15 which it is desired to connect to a bar or the like, for example a terminal-screw 16 of a sparking plug. As illustrated, this member 15 is shown as a split sleeve carried by the end of a high-tension cable 17 to be connected to the sparking plug, indicated at 18 in Figure 6.

The free ends of the prongs 10, 11 are formed each as a hook 19, 20, respectively shaped like a shepherd's crook, which lie each in the plane of the prong on which it is provided. These hooks are identical in shape and are directed away from one another; they are each disposed substantially in the general plane containing the prongs and are placed back-to-back, but slightly overlapping, as shown in Figures 1 and 7 with the hook 20 situated in front of hook 19. Each hook may be regarded as having a concave side and a convex side.

In order to attach the device to a bar or terminal such as 16, whereof the ends are not accessible for slipping it over one of them, the bar is slipped between the prongs to a position such as that shown in Figure 3. This slipping movement can take place with the general plane of the prongs and hooks lying at right-angles to the direction of length of the bar, as indicated in Figure 3. The device is then twisted about its longitudinal axis in either direction to bring the hooks into the desired engaging position, the bar being held stationary. In Figures 3–5 it is assumed that the device is twisted in a counter-clockwise direction as viewed when looking from the root to the hooks. During this twisting operation the bar will first be in contact with the prongs on the convex side of the hooks and will arrive at the end of a movement approaching 90° into a position such as shown in Figure 4, wherein the general planes of the hooks are substantially parallel with the bar 16, the prongs are splayed apart somewhat and the hook 20 lies behind the hook 19 as viewed from a position in front of the head of the screw 13. On twisting the device a little further the prongs are splayed a little more apart, and toward the end of a movement approaching 180° and their concave sides will then be in contact with the bar, with the general planes of the hooks again lying transversely of the bar. In this position the two hooks completely overlap one another and are in a position to receive the bar upon being moved towards it, as shown in Figure 5. Those faces of the hooks which are shown uppermost in Figure 3, are now both directed downwards. The prongs being in a strained condition owing to the twist imparted to the device, the hooks close upon the bar 16 and firmly grip it.

The final movement between the device and the bar longitudinally of the prongs is assisted by the camming action of the sides of the prongs, which lie across one another at an angle close to the hooks and are urged together in the manner of scissor-blades by their resiliency. When the hooked prongs are made in the form of shepherds' crooks as hereinbefore described the angle between the co-acting sides of the prongs during that final movement is increased as compared with the angle when plain hooks of U-shape are used, and it is found that the said final movement is performed automatically.

Even if the hooks 19, 20 do not overlap slightly as shown in Figure 1, but lie "back-to-back" in the same general plane, it is clear that the device can be applied to a bar in the same manner as described above.

If the hooks are back-to-back but overlap slightly, when applying the device to a bar it can first be held with the general plane of the hooks not transversely of the bar as shown in Figure 3, but parallel to the direction of length of the bar, when the bar can be slipped directly between the prongs into the position shown in Figure 4, without imparting any material angular movement to the device about its longitudinal axis, whereupon it is only necessary to twist the device through about a right-angle or rather less, in order to arrive at the "engaging" position; and it is for this reason that this overlapping construction is preferred.

Also, if one prong is without a hook, but is equal in length to the other prong with its hook, the device will operate in an analogous manner, the bar being embraced, however, by only one hook, against one limb of which it will be resiliently pressed by the prong that has no hook.

In the illustrative embodiment one end of the sleeve 15 is extended along about half of its circumference to form a flat terminal 21 that carries the screw 13 and extends in the direction of length of the prongs 10, 11. The outer end of this terminal is bevelled, as shown at 22, to permit the core 23 of the cable 19 to be wedged between the prongs and the terminal as shown in Figure 6. An outer sleeve 24 of insulating material, such as vulcanite or the like, may be carried at one end by the split sleeve 15, the other end of the sleeve 24 being closed except for a slot through which the prongs extend, as clearly shown in Figures 6 and 7.

Although the connecting device has been described as an electrical connection it may be used as a purely mechanical connecting device, for example for connecting a chain to a bar or ring.

From the above it will be appreciated that whatever the initial relationship of the two "jaws" of the hooks may be, they may be brought, by the twisting of the device as a whole, into positions in which they will resiliently close upon and grip a bar placed between them. Various modifications in the details of construction may be made without departing from the scope of the invention as defined in the claims. For example, the prongs may be secured in any convenient manner for example by welding or soldering, to the member carrying them.

We claim:

1. A connecting device comprising two connected prongs disposed side-by-side and resiliently movable relative to each other, one of said prongs at least having at its free end a hook lying substantially in a plane containing the prong on which it is provided while extending away from the second prong and being so shaped and positioned relative to said second prong as to enable a bar embraced by the hook to be gripped therein by the resilient pressure of said second prong when the latter lies transversely of the hooked prong pressing the bar against one limb of said hook, the prongs being of such length relative to the thickness of the bar to permit their being resiliently strained apart and the bar to be slipped between the prongs by a relative movement of the device and the bar in the direction of length of the prongs, the device and bar then being capable of relative rotation about the longitudinal axis of the device thereby straining the prongs into a position for the hook to face and being engageable with the bar, the latter being gripped resiliently therein by said second prong.

2. A connecting device as specified in claim 1, wherein each prong has a hook at its free end, said hooks lying each substantially in a plane containing the prong on which they are provided, being so shaped and disposed as to cause the bar, in the engaged position of the device thereon to be gripped by the limb of one hook resiliently pressing it against the limb of the other hook.

3. A connecting device as specified in claim 1, wherein each prong has a hook at the free end thereof lying each substantially in a plane containing the prong on which it is provided, both hooks being of U-shape and having parallel limbs of the U, and being so disposed as to cause the bar, in the engaged position of the device thereon to be gripped by the limb of one hook resiliently pressing it against a limb of the other hook.

In testimony whereof we have signed our names to this specification.

FRANK BOURNE.
CEDRIC ADDLEY BOURNE.